US011379907B1

(12) United States Patent
Jin et al.

(10) Patent No.: US 11,379,907 B1
(45) Date of Patent: Jul. 5, 2022

(54) SYSTEMS AND COMPUTERIZED METHODS FOR ITEM CORRELATION AND PRIORITIZATION

(71) Applicant: Coupang Corp., Seoul (KR)

(72) Inventors: Chang Geun Jin, Seoul (KR); Lianxi Bai, Seoul (KR); Sung Jin Park, Seoul (KR); Sang Ho Lee, Seoul (KR); Hyun Yop Jung, Seoul (KR); Jeong Seok Oh, Gyeonggi-do (KR); Sun Hee Hwang, Seoul (KR); Eung Soo Lee, Gyeonggi-do (KR); Woong Kim, Gyeonggi-do (KR); Xiufang Zhu, Beijing (CN); Zhongnan Li, Shanghai (CN); Leming Lv, Shanghai (CN); Jaehyun Kim, Seoul (KR); Yong-Cho Hwang, Seoul (KR); Erik Rehn, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 17/118,879

(22) Filed: Dec. 11, 2020

(51) Int. Cl.
*G06N 20/00* (2019.01)
*G06Q 30/06* (2012.01)
(Continued)

(52) U.S. Cl.
CPC . *G06Q 30/0639* (2013.01); *G06Q 10/063116* (2013.01); *G06Q 10/087* (2013.01);
(Continued)

(58) Field of Classification Search
CPC .................. G05B 2219/32037; G07F 7/0886
See application file for complete search history.

(56) References Cited

U.S. PATENT DOCUMENTS 7,774,243 B1 * 8/2010 Antony ................ G06Q 10/087
 53/445
9,699,173 B1 * 7/2017 Roth ...................... H04L 63/083
(Continued)

FOREIGN PATENT DOCUMENTS

JP          6622550 B2     12/2019
KR   10-2015-0089793 A     8/2015
(Continued)

OTHER PUBLICATIONS

International Search Report in counterpart International Application No. PCT/IB2020/062536, dated Sep. 6, 2021 (10 pages).

*Primary Examiner* — Peter Ludwig
*Assistant Examiner* — Avia Salman
(74) *Attorney, Agent, or Firm* — Finnegan, Henderson, Farabow, Garrett & Dunner LLP

(57) ABSTRACT

The present disclosure provides a computerized method item correlation including: receiving an indication of an order comprising at least one item; determining if the order is urgent based on an amount of time remaining until the items must ship to a customer; determining a location of each of a plurality of pickers; iteratively, for items in the order: identifying a picker closest to the item, the picker having a current job priority; correlating the closest picker and the item in a data structure; re-correlating, in the data structure, at least one item previously correlated with the closest picker to an alternate picker in response to the current job priority not being urgent; sending, to a user device of the closest picker, a location and item identifier associated with the item; and storing, in the data structure, a completion flag in correlation with the item upon receipt of an item-complete message.

15 Claims, 16 Drawing Sheets

(51) Int. Cl.
*G06Q 10/08* (2012.01)
*G06Q 10/06* (2012.01)

(52) U.S. Cl.
CPC ... *G06Q 10/08345* (2013.01); *G06Q 30/0635* (2013.01); *G06N 20/00* (2019.01)

(56) References Cited

U.S. PATENT DOCUMENTS

| | | | |
|---|---|---|---|
| 2012/0191551 A1 | 7/2012 | Lutnick et al. | |
| 2016/0140488 A1* | 5/2016 | Lindbo | G06Q 10/087 |
| | | | 705/28 |
| 2017/0200117 A1* | 7/2017 | High | G06F 3/1423 |
| 2018/0025407 A1* | 1/2018 | Zhang | G06Q 10/02 |
| | | | 705/26.81 |

FOREIGN PATENT DOCUMENTS

| | | | | |
|---|---|---|---|---|
| WO | WO 2011-150131 A1 | 12/2011 | | |
| WO | WO 2018-237105 A1 | 12/2018 | | |
| WO | WO-2020233978 A1 * | 11/2020 | | B65G 1/1373 |

* cited by examiner

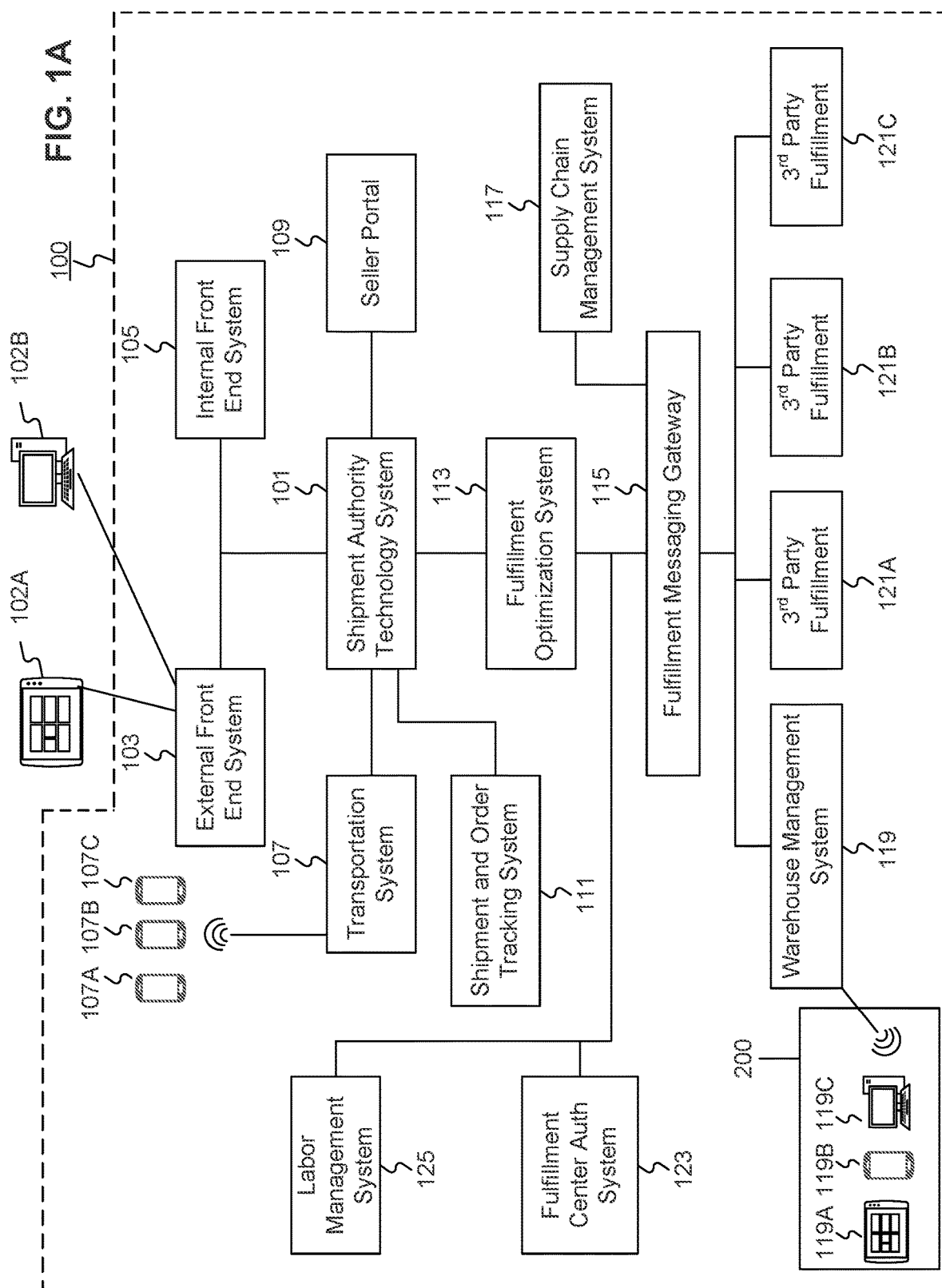

SYSTEMS AND COMPUTERIZED METHODS FOR ITEM CORRELATION AND PRIORITIZATION

TECHNICAL FIELD

The present disclosure generally relates to computerized systems and methods for computer-determined item correlation and prioritization. In particular, embodiments of the present disclosure relate to inventive and unconventional systems and methods utilized for ensuring efficient correlation of items with pickers, allowing quicker assignments, faster shipment to customers, and reduced shipment cost.

BACKGROUND

Order fulfillment is a complex endeavor for businesses that provide tangible goods to customers. This complexity grows substantially for businesses that provide a large variety of goods, process a high volume of orders, or store items across a large physical area, including a single large warehouse, multiple warehouses, or even multiple small facilities distributed in a dispersed geographic area. This complexity greatly increases order fulfillment costs as businesses must compensate employees for time spent picking and preparing items for delivery. In addition, as the time required for an item picker to transit to an item grows, a business may be unable to fulfill as many orders and may lose customers to competitors offering similar products with a shorter delivery time, thus decreasing sales. Additionally, the business may be forced to hire additional employees, thereby increasing cost.

Additionally, customers have grown to expect quick shipping, in some cases demanding delivery on the same day or even same hour as the order is placed. Order fulfillment centers frequently rely on complex computerized algorithms to identify optimal routing of pickers in storage areas or throughout a geographic region. These algorithms attempt to reduce the amount of time required to collect goods in preparation of packing and shipping. While this solution may suffice for low-scale operations for order fulfillment centers with low inventory, low order rates, predictable orders, and few stock keeping units (SKUs), this solution is impractical for larger operations. For example, the computational time required to analyze many combinations of pickers and items, as well as optimizing their routes, introduces inefficiencies in picking operations that negate the hoped-for time savings.

Additionally, a large component of consumer cost is shipping cost. However, shipping costs are highly variable based on how order fulfillment centers pack goods. Packaging costs, too, may vary significantly, depending on box, tape, and other material choices. Shipping and packaging choices introduce further combinations that may maximize cost efficiency. Optimizing all of these combinations, though, requires processing prior to assigning items to pickers. As this processing time grows, pickers are forced to wait for assignments, which decreases picking efficiency. Thus, assignment algorithms may save time for pickers after assignments are disseminated, but traditional algorithms increase delays between assignments, with a net detriment to order fulfillment efficiency Accordingly, there is a need for improved methods and systems for computational algorithms to efficiently analyze various combinations of packaging, picker routings, and picker assignments to arrive at optimized picker tasking without delaying assignment times. With these systems and methods, picking operation efficiency may increase, while delivery time decreases, thereby reducing overall business costs and improving customer satisfaction.

SUMMARY

One aspect of the present disclosure is directed to a computerized system for item correlation, comprising: at least one processor; and at least one non transitory storage medium comprising instructions that, when executed by the at least one processor, cause the at least one processor to perform steps comprising: receiving an indication of an order comprising at least one item; determining if the order is urgent based on an amount of time remaining until the items must ship to a customer; determining a location of each of a plurality of pickers; iteratively, for items in the order: identifying a picker closest to the item, the picker having a current job priority; correlating the closest picker and the item in a data structure; re-correlating, in the data structure, at least one item previously correlated with the closest picker to an alternate picker in response to the current job priority not being urgent; sending, to a user device of the closest picker, a location and item identifier associated with the item; and storing, in the data structure, a completion flag in correlation with the item upon receipt of an item-complete message from the user device indicating that the item has been picked.

Another aspect of the present disclosure is directed to a computer-implemented method for item correlation, comprising: receiving an indication of an order comprising at least one item; determining if the order is urgent based on an amount of time remaining until the items must ship to a customer; determining a location of each of a plurality of pickers; iteratively, for items in the order: identifying a picker closest to the item, the picker having a current job priority; correlating the closest picker and the item in a data structure; re-correlating, in the data structure, at least one item previously correlated with the closest picker to an alternate picker in response to the current job priority not being urgent; sending, to a user device of the closest picker, a location and item identifier associated with the item; and storing, in the data structure, a completion flag in correlation with the item upon receipt of an item-complete message from the user device indicating that the item has been picked.

Yet another aspect of the present disclosure is directed to a computer-implemented method for item correlation, comprising: receiving an indication of an order comprising at least one item; determining a priority of the order based on an amount of time remaining until the items must ship to a customer; determining a location of each of a plurality of pickers; iteratively, for pending items of the order: accessing at least one data structure to determine a location of the pending item; determining a set of near pickers within a threshold distance to the location; accessing the at least one data structure to determine previous items correlated to each of the set of near pickers; removing from the set any near picker having a number of previous items greater than a queue threshold; adding, to the set, pickers within an expanded threshold distance in response to the set being empty after the removing of pickers; identifying, from the set of near pickers, a picker closest to the item in response to the priority being urgent; identifying, from the set of near pickers, a picker having a smallest queue distance in response to the priority being normal, wherein a queue distance represents how far a picker is from a nearest correlated item of the picker; correlating the pending item with the identified picker in the at least one data structure; sending, to a user device of the closest picker, a location and item identifier associated with the item; and storing, in the data structure, a completion flag in correlation with the item upon receipt of a message from the user device that the item has been picked.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for efficient grouping of ordered items into packages.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
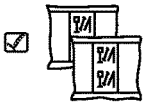
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
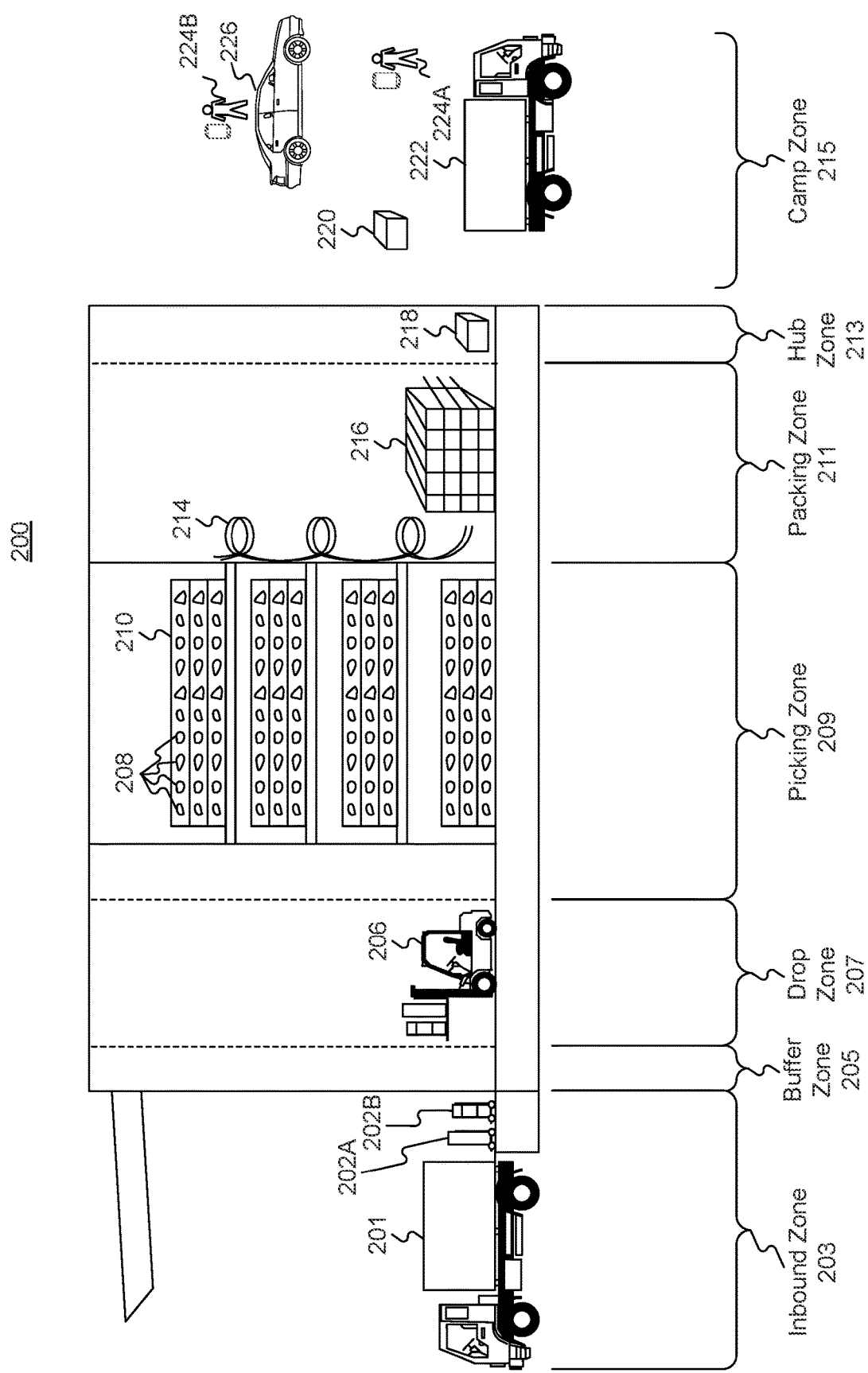
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
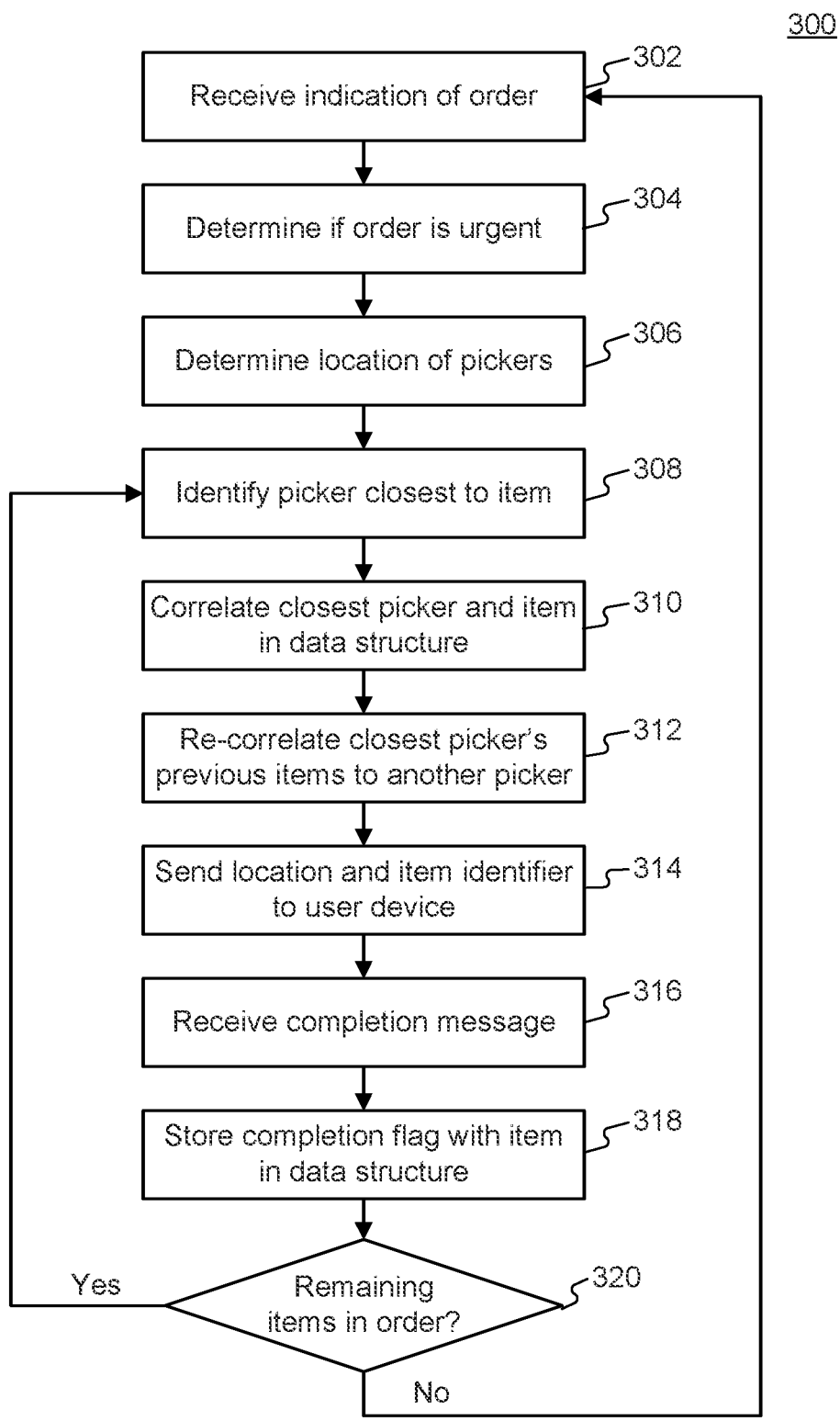
FIG. 3 is a flow chart illustrating an exemplary embodiment of a method for item correlation in a data structure, consistent with the disclosed embodiments.

FIG. 3 illustrates an exemplary embodiment of a method for item correlation in a data structure, consistent with the disclosed embodiments. FIG. 3 shows steps of a process 300. FO system 113 may perform process 300 to produce data structures for use in managing picking operations. In step 302, FO system 113 begins with receiving an indication of an order comprising at least one item. The order may constitute a variety of items and quantities distributed in a warehouse, plurality of warehouses, or other storage sites. In some situations, an item may comprise a quantity of a bulk good that requires a picker to visit multiple sites to obtain the requested quantity. For example, an order may require 1,000 pounds of corn, while each of a plurality of storage sites only contain 300 pounds of corn. Similarly, and item may require multiple, separately stored pieces, such as a bicycle having a frame and tires stored in different locations in a warehouse. Thus, process 300 may help assign an item requiring multiple stops, as well as individual items requiring a single stop by a picker. Process 300 may also assign multiple pickers to items requiring multiple stops, thereby distributing the picking operation and speeding package preparation.

At step 304, FO system 113 may determine if the order is urgent based on an amount of time remaining until the items must ship to a customer. Step 304 may include a calculation based on the PDD of the order, as well as determination of the expected time required for shipment. Thus, FO system 113 may determine how much time a fulfilment center has to process, locate, pack, and send a package for shipping. If this amount of time is less than a threshold, FO system 113 may categorize the order and each of the order's items as urgent. For example, if a fulfillment center has less than 30 minutes until an order must leave the center and enter shipping to reach the customer by the PDD, FO system 113 may determine the order is urgent. Alternatively, if the time is greater than 30 minutes, FO system 113 may determine the order is normal priority.

Additionally, a customer may assign an urgent priority to an order at the time of purchase, for instance, by electing to pay an additional charge for quicker delivery. A business may also assign an urgent priority according to customer priority, such as a premier plan membership, item perishability, picker availability, special handling requirements for an item including weight and size limitations or special equipment needs, transportation regulations, traffic, tolls, and other shipping cost considerations.

At step 306, FO system 113 determines a location of each of a plurality of pickers. For example, a user device of a picker, such as device 119B, may report the device location to FO system 113. Each picker on a warehouse floor may carry a separate device. Devices may include hardware and/or software to determine the location's position. Devices may determine and report their respective locations to FO system 113, such as using a WiFi or cellular signal to report the device's position as determined by a GPS receiver in the device. In some embodiments, devices may determine locations by measuring a signal strength, such as WiFi, and triangulating the device location based on a plurality of WiFi signals. Alternatively or additionally, FO system 113 may determine locations of devices. For instance, a warehouse may also have other sensors, such as IR sensors, which receive IR signals from user devices signaling an identification code, or RFID sensors that register the presence of an RFID tag disposed on a user device. A warehouse may also contain cameras to visually identify and locate pickers and/or their associated devices, carts, and packages. Visual identification may be aided by identifying images, such as a QR code, facial recognition, and the like. FO system 113 may correlate these codes in a database to a device and corresponding user.

At step 308, FO system 113 begins to iteratively, for items in the order, correlate items and pickers in a data structure. In some embodiments, FO system 113 may correlate each item in the order. Alternatively, FO system 113 may correlate only a subset of the order first, saving a second subset for a later time. For example, an order may contain both urgent and normal priority items. FO system 113 may correlate the urgent items from the order, as well as urgent items from other orders, before correlating the normal priority items.

In step 308, FO system 113 identifies a picker closest to the item, the picker having a current job priority. Step 308 may further include determining, from a data store, where the item is located in a warehouse, geographical area, and the like. That is, a data store may contain list of item identifiers and corresponding locations, and FO system 113 may query the data store to retrieve location identifiers, such as geographical coordinates, warehouse number, floor number, bay number, shelf number, and the like. In some embodiments, the distance may be a direct line between the item and a picker, ignoring any intervening obstacles. Alternatively, each of the plurality of distances may comprise a total length of a path between a picker location and the item location so as to avoid obstacles. FO system 113 may determine a route by, for example, determining a line between the start and destination, and, for points along the line, identifying a closest point available to travel, such as space between shelves, roads, and the like, and re-determining a line between the closest point and the destination, until all points of the route lie on traversable paths. Distances may also be measured as the amount of time required to travel between two points, rather than the geometric length of a path. That is, FO system 113 may employ algorithms to determine the shortest route and expected travel time between two points while traveling around any obstacles such as shelves, pillars, walls, or doors as reflected in a stored map of a warehouse. FO system 113 may also employ algorithms that take into account distances between floors, such as in a multi-story warehouse. In some embodiments, FO system 113 may determine the shortest path along highways and surface streets, as well as distances for parking, walking, or other modes of transportation.

When FO system 113 identifies the closest picker, FO system 113 may also determine a current job priority of the picker. Pickers performing picking operations may have current job priorities reflecting the priority of their currently-assigned items. For example, picker A may be locating items assigned an urgent priority because they must ship soon to reach a customer by a promised time, while picker B locates items assigned a normal priority. In this case, picker A has a current job priority of "urgent" while picker B has a current job priority of "normal." FO system 113 may determine the picker's current job priority by sending a query to the user device 119B of the picker to determine current assignments. FO system 113 may also query a data structure containing correlations between picker identifiers, item identifiers, and priorities, as will be discussed with reference to step 310.

At step 310, FO system 113 correlates the closest picker and the item in a data structure. In some embodiments, the data structure may be a dictionary, JSON file, SQL database, or the like containing an item identifier correlated to a picker identifier. The data structure may include additional information, such as correlation time, order identifier, or item location. The data structure may also contain correlation sequence, such as an ordinality of items assigned to a picker. For example, three items, A, B, and C, may be correlated with picker Z. If FO system 113 correlated item A at 11:15, B at 11:02, and C at 11:50, the items may have ordinality of B:1, A:2, C:3. Each item, along with its respective ordinality, may be correlated in the data structure with picker identifier Z. Further, ordinality of the items may be based on distance, such that a closers items have smaller ordinality. User devices of pickers may display items according to respective item ordinalities, indicating the order in which a picker should locate items.

Ordinality may also be based on a picking sequence optimized to reduce overall picking time. For example, in some embodiments, FO system 113 may determine a shortest path connecting each of the items correlated to a picker, and assign ordinality to the items based on the determination. To make this determination, FO system 113 may begin by determining the closest item to the picker. FO system 113 may then determine the closest item to the previous closest item, and iteratively add items to a sequence until all items have been added. FO system 113 may employ other algorithms as well, such as making a random selection of items, and iteratively eliminating path crossover points of a path until no more crossovers remain.

At step 312, FO system 113 may re-correlate, in the data structure, at least one item previously correlated with the closest picker to an alternate picker in response to the current job priority not being urgent. For example, if a picker's current job priority is normal, the items previously correlated with the picker also had a normal priority. If the picker is the closest picker to an urgent item, FO system 113 may re-correlate the normal items to an alternate picker so that the closest picker may proceed to the urgent item. In some embodiments, the previously-correlated item(s) may be de-correlated from the closest picker and held in memory for later correlation. For instance, FO system 113 may correlate all items of an urgent order prior to previously-correlated, non-urgent items. In this manner, urgent items may be correlated prior to normal priority items so that pickers may begin urgent operations quickly.

In some embodiments, FO system 113 may re-correlate a subset of the items previously correlated with the closest picker, thereby allowing some items to remain correlated with the closest picker. For example, as stated previously, items correlated with the closest picker may be sequenced in the data structure, such as according to respective correlation times. In the sequence, a first N items may be fixed, and a remaining M items may be mutable. Further, the length of the sequence may be limited to N+M items. Thus, re-correlating at least one item previously correlated with the closest picker may comprise re-correlating mutable items. As an illustration, a picker may be limited to 10 correlated items (N+M=10). Of those 10 items, items 1-3 in the sequence may remain fixed (N=3), while items 4-10 may be mutable (M=7). If the picker is identified as a closest picker for an urgent item, FO system 113 may re-correlate items 4-10 with an alternative picker, leaving items 1-3 correlated with the closest picker. FO system 113 may add the urgent item to the data structure with an ordinality of the beginning of the sequence (i.e., place 1). Alternatively, FO system 113 may add the urgent item to the data structure with an ordinality of the end of the fixed section (i.e., place 3). Such restrictions on item placement and re-allocation may reduce computational resources that would otherwise be necessary to re-correlate all items. Further, this may allow more efficient picking operations by allowing pickers to remain focused on a task, rather than switching tasks. Further, in some embodiments, FO system 113 may select a second closest picker in response to a first closest picker having a sequence length of N+M. For example, a maximum sequence length may be 10 (N+M=10). If a closest picker to an item already has 10 item correlations in the data structure, FO system 113 may correlate a new item with the second closest picker to avoid exceeding the maximum sequence length of the first picker.

At step 314, FO system 113 sends, to a user device of the closest picker, a location and item identifier associated with the item. In some embodiments, FO system 113 may also send a route to the user device, such as a walking or driving route calculated when determining ordinality based on location, as described above. Further, FO system 113 may provide a picture of the item and/or location to aid the picker.

At step 316, FO system 113 receives an item-complete message from the user device indicating that the item has been picked. For example, a picker may touch a button on a user interface of the user device indicating that the picker has found a correlated item. In some embodiments, a picker may scan an indicia of an item, such as a barcode, QR code, RFID tag, and the like. This may further indicate that the item is being routed for packing and shipping. In some scenarios, a picker may place the item into a container for transport to a packing station. The picker may indicate that the item is complete when the item is placed into the container. At step 318, FO system 113 stores, in the data structure, a completion flag in correlation with the item. The completion flag records that the item no longer requires correlation with a picker in the data structure. FO system 113 may immediately, or periodically, de-correlate the item from any pickers if the item has a completion flag.

At step 320, FO system 113 determines if there are any remaining items in the order. If step 320 is YES, FO system 113 returns to step 308 to continue correlating items with pickers. However, if all items of the order have been correlated, step 320 is NO, and FO system 113 returns to step 302 to receive an indication of a new order. In some embodiments, FO system 113 may continue receiving indications of new orders while correlating items. FO system 113 may hold new order indications in a buffer until processing is available to correlate the items of the orders. FO system 113 may also distribute processing to multiple processors having read and write access to the data structure, allowing synchronous correlation activities.

Figure 4:
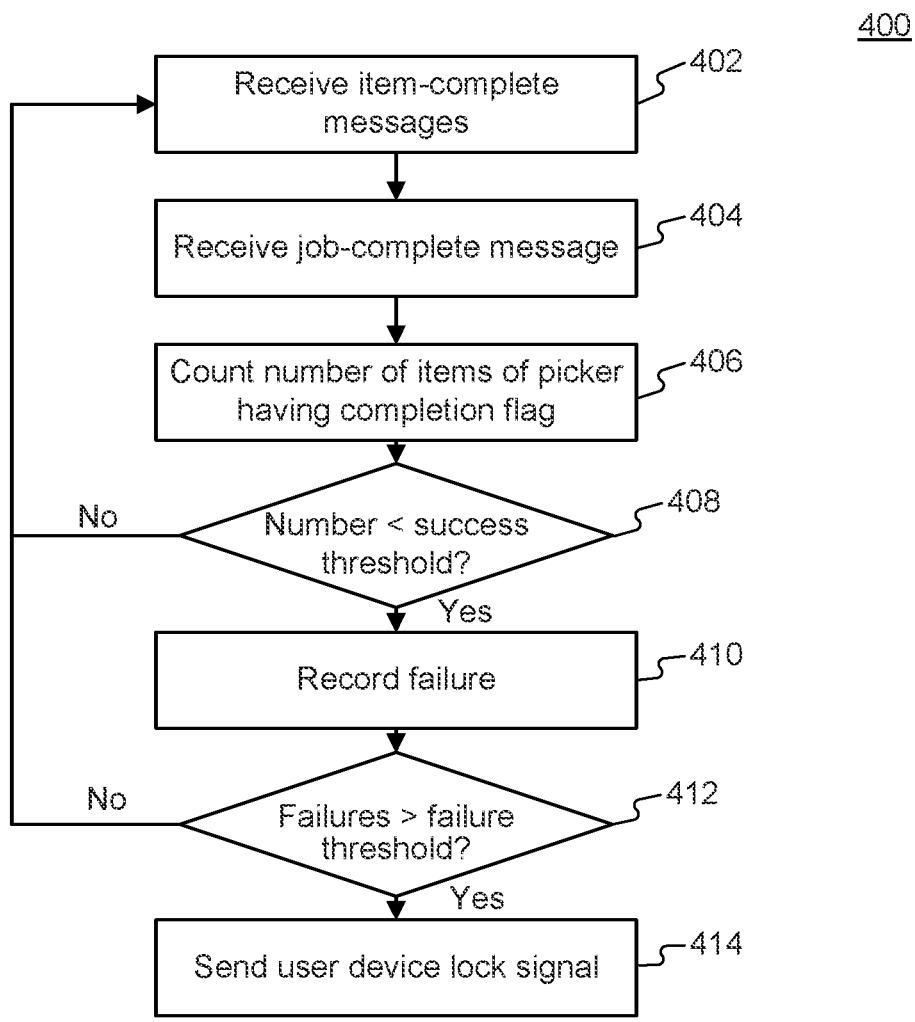
FIG. 4 is a flow chart illustrating an exemplary embodiment of optimizing item processing, consistent with the disclosed embodiments.

FIG. 4 is a flow chart illustrating an exemplary embodiment of optimizing item processing, consistent with the disclosed embodiments. In some scenarios, a picker may indicate that his container is full prior to the container actually being full. For instance, a picker may do this to meet a container quota quicker. If pickers are instructed to deliver a container to a packing station as soon as the container is full, a picker may indicate that his container is full so he may travel directly to a packing station and avoid having to travel to a remote part of a warehouse to pick a correlated item. However, these types of actions greatly diminish picking efficiency, and are detrimental to prompt delivery and customer satisfaction. Therefore, process 400 provides a method for FO system 113 to track picker efficiency in the data structure to prioritize correlation with successful pickers.

At step 402 of process 400, FO system 113 receives a plurality of item-complete messages from a user device of a picker among the plurality of pickers. For example, many different pickers may be active in a warehouse, and each of them may submit item-complete messages. As FO system 113 receives item-complete messages, FO system 113 may record the messages by adding completion flags in correlation with the items in the data structure.

At step 404, FO system 113 receives a job-complete message from a user device of a picker among the plurality of pickers. The job-complete message may indicate that a picker has filled a container, for instance, and the picker may initiate the message by selecting a button on a user interface of the user device. Upon receipt of the job-complete message, FO system 113 may access the data structure and count a number of items correlated to the picker that have the completion flag at step 406. FO system 113 may also archive items marked as complete. In step 406, FO System 113 may count a number of items having a completion flag and correlated to the picker. Step 406 may include constructing a query to retrieve every entry having an identifier of the picker. At step 408, FO system 113 compares the number of items to a success threshold to determine a failure. For example, a fulfilment center may have a success threshold of three items per container. If a picker's container holds fewer than three items but the picker marks the container as full, the fulfillment center may consider this container to be inefficient and counted as a failure to maximize efficiency. If the number of items correlated to the picker and having the completion flag is greater than the success threshold, step 408 is NO, and FO system 113 returns to step 402 to receive additional item-complete messages and job-complete messages. On the other hand, if the number is less than the success threshold, step 408 is YES, and FO system 113 proceeds to step 410 to record a failure. FO system 113 may record the failure in the data structure in association with the picker, for instance. FO system 113 may also record the failure in a separate data structure with picker information, such as employee ID, shift time, success rates, failure rates, and other performance metrics.

A picker may fail to fully utilize a container due to necessity, for instance, if particular items are large and the container cannot fit more items. However, if a picker frequently fails to fill containers, it may indicate that the picker is inefficient. Thus, FO system 113, at step 412, compares the number of failures to a failure threshold. For example, a failure threshold may be a number, such as three failures total, or a rate, such as three failures in an hour. As part of step 412, FO system 113 may produce a query to find a number of failures associated with the picker. If the number of failures is less than the failure threshold, step 412 is NO, and FO system 113 returns to step 402. However, if the number of failures is greater than the failure threshold, step 412 is YES, and FO system 113, at step 414, sends a signal to lock the user device of the picker. Locking the user device may include, for example, preventing the user device from displaying additional locations and item identifiers. In some embodiments, the user device may require a manager code to unlock. In this way, an inefficient picker may need to visit a manager and explain why the picker had a high failure rate. Additionally, FO system 113 may record that the picker has been locked. FO system 113 may then re-correlate items that were assigned to the locked picker, so that a new picker may continue locating items. FO system 113 may also prioritize pickers that have not been locked out when correlating items and pickers. For example, FO system 113 may correlate an item to second picker that is farther from an item than a first picker because the first picker has a high failure rate.

In some embodiments, the success threshold may be based on packaging requirements, for instance, of a fulfilment center. Different fulfilment centers may have different sized containers. For instance, urban fulfilment centers may have more small orders and therefore smaller containers than rural fulfilment centers. The success threshold may be calculated based on item sizes, as well, and FO system 113 may compare container volume to the combined volume and/or weight of correlated items of a picker. Thus, success threshold may vary by picking location, such that pickers at a location have the same success threshold, or by item attributes, such that containers have varying success thresholds depending on which items are correlated to a picker.

In some scenarios, an order may contain multiple items. The items may need to be delivered to a single address. In this case, it may be beneficial for a single picker to locate multiple items of the order to reduce packaging and shipment costs for multiple shipments, even though it may take longer for the picker to locate multiple items. For example, if an order has two items, and the first item is located on a first floor of a warehouse while the second item is located on the second floor, a picker may require significant time to travel between the two items. However, the cost of this lost productivity may be less than the cost of arranging the two items into a single shipment at a packing phase, or the cost of shipping the items independently.

Figure 5A:
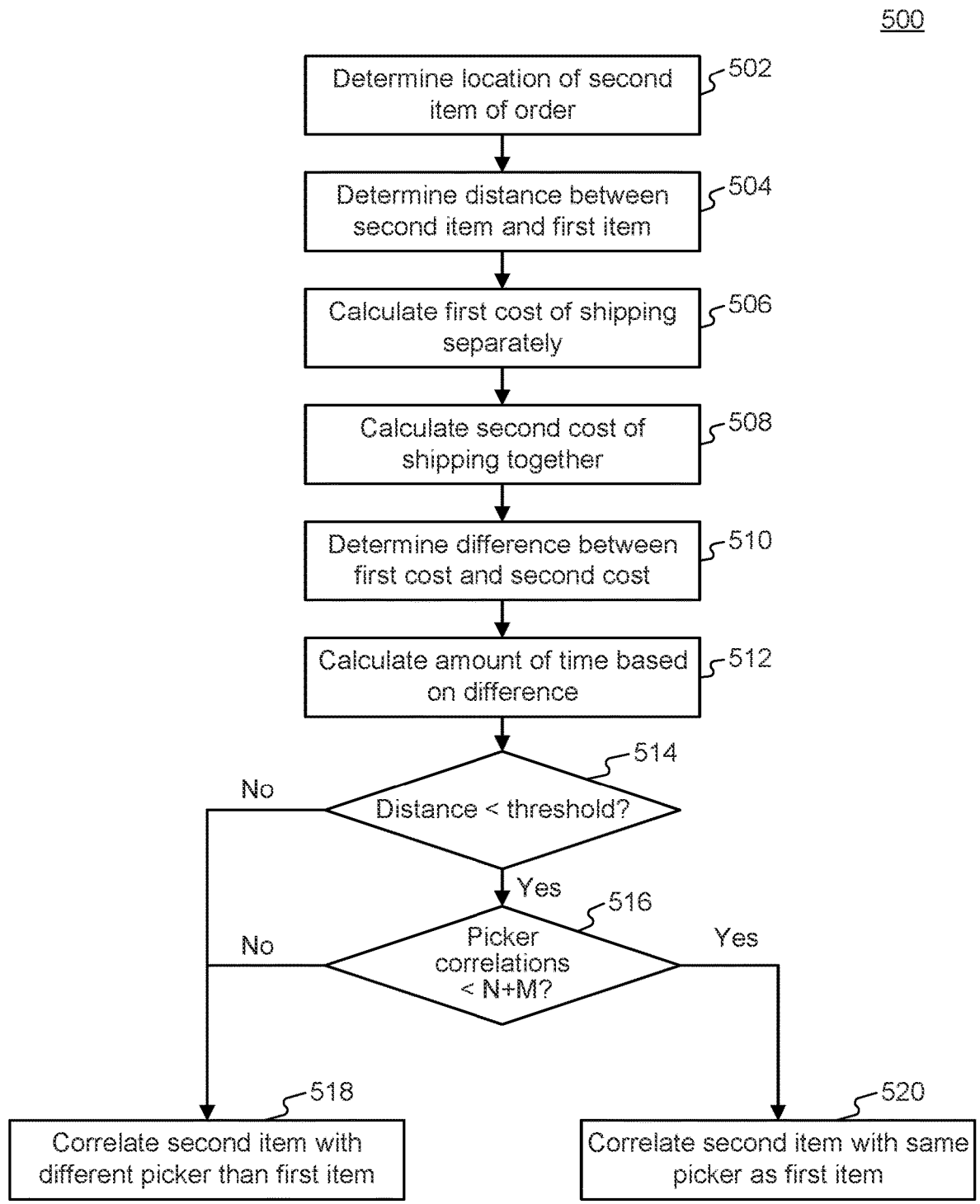
FIG. 5A is a flow chart illustrating an exemplary embodiment of a method for paired item correlation, consistent with the disclosed embodiments.

Therefore, FO system 113 may employ process 500 to optimize item correlations according to shipping costs. FIG. 5A is a flow chart illustrating an exemplary embodiment of a method for paired item correlation, consistent with the disclosed embodiments. At step 502, FO system 113 determines a location of a second item of the order, and, at step 504, determine a distance between the second item and the first item. This distance may be a radial distance, or may be based on routing considerations.

At step 506, FO system 113 calculates a first cost based on shipping the first item and second item separately. This first cost may include a calculation of packaging materials for two packages, such as two boxes and tape and labels for each box. The first cost may also include handling fees for tracking separate parcels in a package tracking system. At step 508, FO system 113 calculates a second shipping cost based on shipping the first item and second item together. The second shipping cost may therefore include packaging materials and handling fees for a single package. Both the first and second costs may also include prices for shipping weight and taxes.

At step 510, FO system 113 determines a difference between the first and second costs, and, at step 512, calculates an amount of time based on the difference. The amount of time may also be based on a picker cost, which, in turn, may be based on a picker's hourly wage, tax, insurance, and other benefits, as well as any break time. For example, a picker may earn $14 per hour in wages, and the employer may also pay $2 for taxes, and $3 for insurance, and an annual bonus that averages to be $1 per hour over a year, for a total cost of $20 per hour for a picker. The picker, however, may receive a ten minute break per hour, resulting in fifty minutes of work. Thus, the picker cost may be $0.40 per minute. At the same time, shipment of two items separately for an order may cost $2, while shipment of the same two items together may cost $1. Thus, if a picker can travel to and locate the second item in less than 2.5 minutes, it may be beneficial to assign both items to a single picker. In some embodiments, the amount of time may be based on longer distances and road and/or air travel, and include costs such as fuel, tolls, tickets, vehicle maintenance, and vehicle depreciation.

At step 514, FO system 113 compares the distance between the first and second item calculated at step 514 with a threshold. FO system 113 may set the threshold to be a distance the closest picker travels during the amount of time. The threshold may be based on the amount of time calculated at step 512 multiplied by an average picker speed. For example, an average picker may walk 300 feet per minute. Continuing the above example, if the second item is less than 750 feet away, the picker would be able to reach the item in less than 2.5 minutes, allowing the two items to ship with an overall lower cost than two pickers selecting items and the items shipping separately. In some embodiments, FO system 113 may also calculate the cost of sending a second picker to the second item, and add this cost to the time calculating at step 512 and the distance threshold calculation. Alternatively, FO system 113 may omit steps 506-512, and use a standard threshold of a set distance, such as 100 feet. If step 514 is NO, FO system 113 proceeds to step 518 to correlate the second item with a different picker than the picker correlated with the first item. If step 514 is YES, FO system 113 proceeds to step 516 to compare a number of picker correlations to the number of items currently correlated with the picker. Step 516 may include querying the data structure to count the number of correlations. If the number of correlations is less than a sum of N fixed items and M mutable items (i.e., if the number is less than N+M), such that the picker's correlations would not exceed a total of N+M by adding one more item correlation, step 516 is YES, and FO system 113 proceeds to step 520 to correlate the second item to the closest picker. However, if the number of correlations is greater than or equal to N+M, step 516 is NO, and FO system 113 proceeds to step 518 to correlate the second item with a different picker than the first item.

Figure 5B:
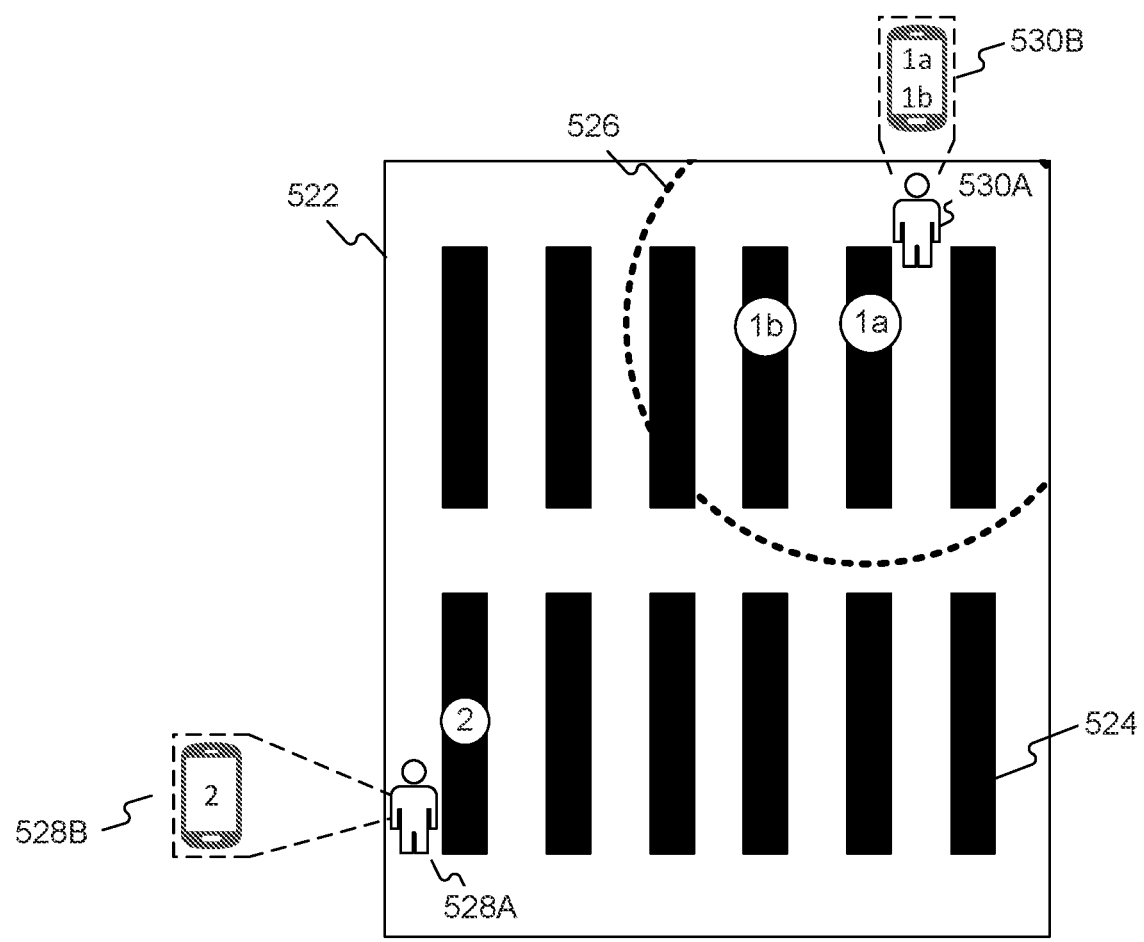
FIGS. 5B and 5C are diagrammatic illustrations of item pairing, consistent with the disclosed embodiments.
Figure 5C:
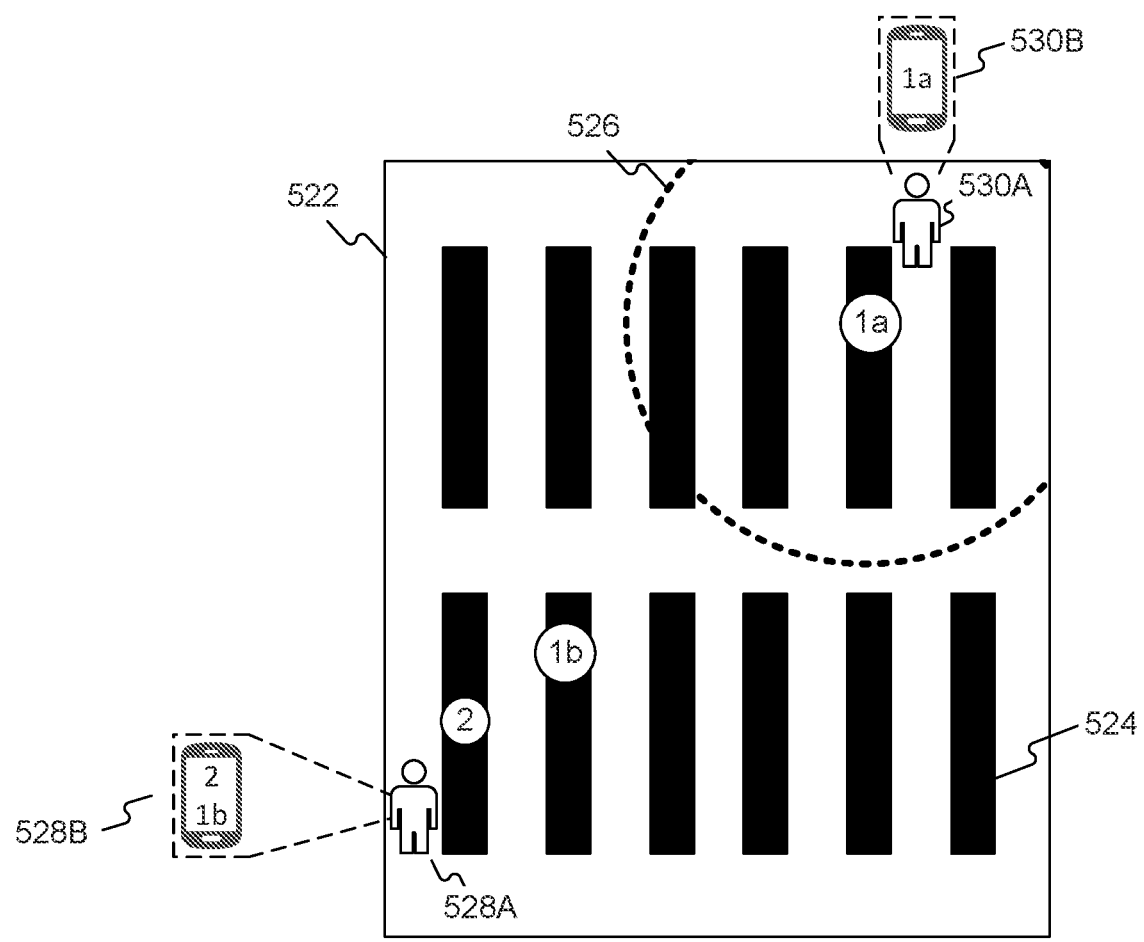

Process 500 may be further understood by reference to FIGS. 5B and 5C showing diagrammatic illustrations of item pairing, consistent with the disclosed embodiments. FIG. 5B illustrates a warehouse 522 having shelves 524. The diagram further shows two pickers, 528A and 530A, having user devices 528B and 530B. User devices 528B and 530B show picker correlations. For instance, user device 528B shows that picker 528A is correlated with item number 2. FIG. 5B further illustrates three items, item 1a, 1b, and 2. Items 1a and 1b are from the same order, while item 2 is from a different order. Item 1a may be considered the first item, while item 1b may be considered the second item. Additionally, FIG. 5B illustrates a radius 526 around item 1a. As shown, item 1b is within radius 526. As a result, step 514 of process 500 is YES, and FO system 113 has correlated both the first item (item 1a) and second item (item 1b) with picker 530A at step 520. This correlation is illustrated in user device 530B. FIG. 5C, however, illustrates an alternative result of process 500. While item 1b was located within radius 526 in FIG. 5B, item 1b of FIG. 5C falls outside of radius 526. As a result, step 514 of process 500 is NO. FO system 113 therefore correlated the second item (item 1b) with a different picker (picker 528A) than the first item (1a) at step 518. Thus, item 1b is correlated with picker 528A, as reflected by user device 528B.

While FO system 113 may receive many orders than have urgent priority, some orders may have normal priority. Further, in some scenarios, re-correlation of items at step 312 of process 300 or re-correlation of items from a locked picker at step 414 of process 400 may be delayed until sufficient processing power is available, for instance, during periods of high order rates. These items may reside in a buffer. Alternatively, these items may be stored in the data structure without a picker correlation. Further, after a period of picker movement throughout an area, better routing and correlations may become possible to improve efficiency over earlier solutions.

Figure 6A:
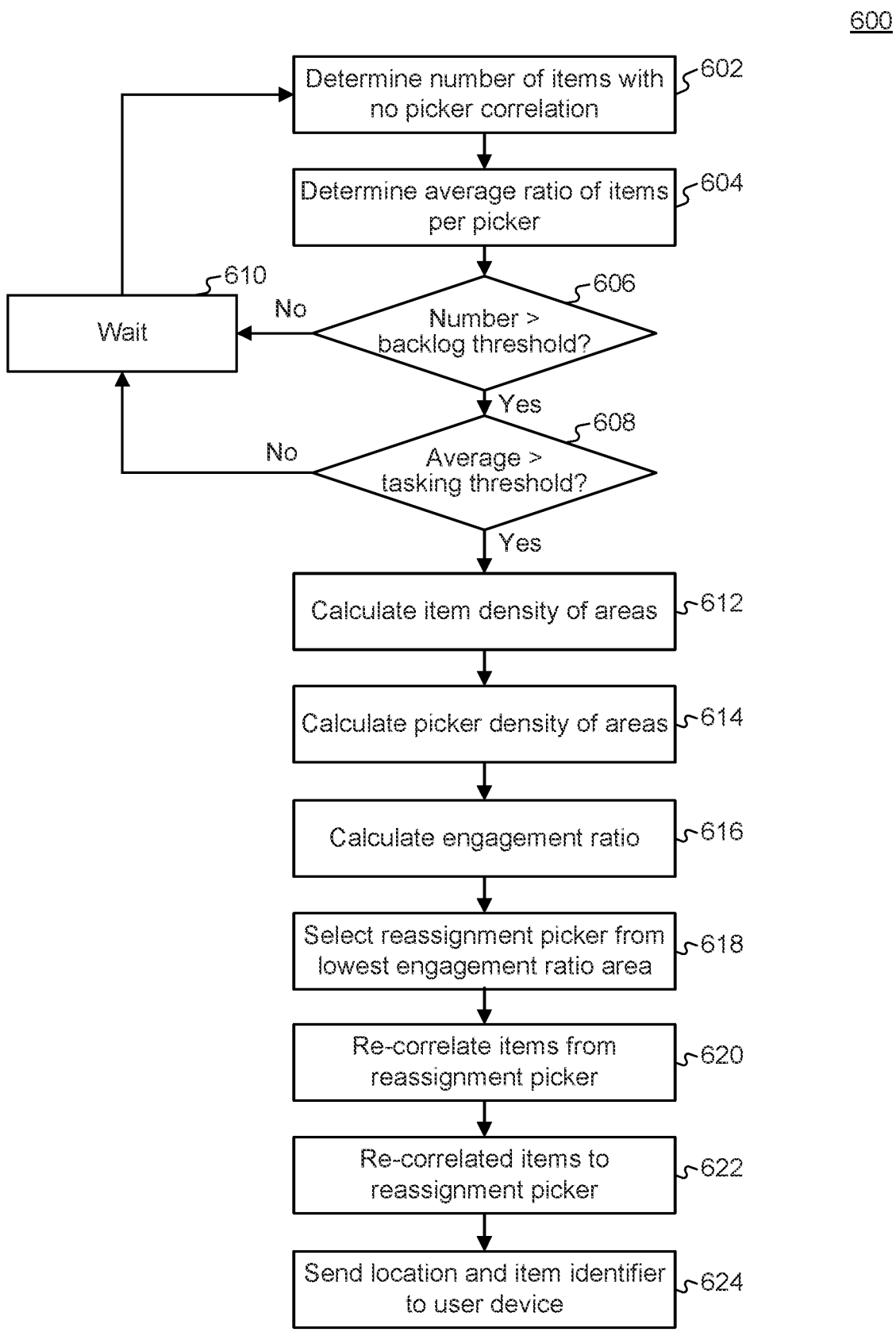
FIG. 6A is a flow chart illustrating an exemplary embodiment of a method for optimizing item correlations, consistent with the disclosed embodiments.

FIG. 6A is a flow chart illustrating an exemplary embodiment of a method for optimizing item correlations, consistent with the disclosed embodiments. As shown in FIG. 6A, FO system 113 may begin process 600 at step 602 by determining a number of items that have no picker correlation in the data structure. FO system 113 may query a buffer and/or the data structure to identify items needing an initial correlation, such as normal priority items from a new order, or items needing re-correlation, such as items from pickers who were later assigned urgent items.

Allocating many items at once may consume resources and prevent FO system 113 from processing urgent items. Thus, process 600 contains test conditions which cause FO system 113 to run process 600 when needed to improve efficiency. For example, at step 604, FO system 113 determines an average ratio of items per picker. This ratio may be, for instance, total item entries in the data structure divided by the total active pickers, with items marked as completed having been removed from the data structure or otherwise not counted at step 604.

At step 606, FO system 113 compares the number of items to a backlog threshold, and compares the average ratio to a tasking threshold at step 608. If either of the comparisons at steps 606 and 608 are NO, FO system 113 proceeds to step 610 to wait for a period of time before re-checking. However, if both of the comparisons at steps 606 and 608 are YES, FO system 113 begins re-correlating items and pickers with step 612. In this way, FO system 113 refrains from using processing resources if there are an insufficient number of items pending correlation, or if pickers are under tasked. In either of these situations, a backlog of items pending correlation may resolve without computationally-expensive optimization efforts. In some embodiments, however, process 600 may omit both or either of steps 606 or 608, such as when computational expense is low. Thus, FO system 113 may perform the re-correlation steps on regular time intervals, such as every minute.

At step 612, FO system 113 calculates an item density of a plurality of areas. For example, FO system 113 may divide a picking area into multiple areas, such as areas having equal size, or areas having equal number of items. FO system 113 may query the data structure to determine locations of each of the pending items, count the number of items in each of the plurality of areas, and divide the number by the area. Similarly, at step 614, FO system 113 calculates a picker density of the plurality of areas by determining the locations of each of the active pickers. Further, FO system 113 calculates an engagement ratio of item density to picker density for each of the plurality of areas at step 616.

Figure 6B:
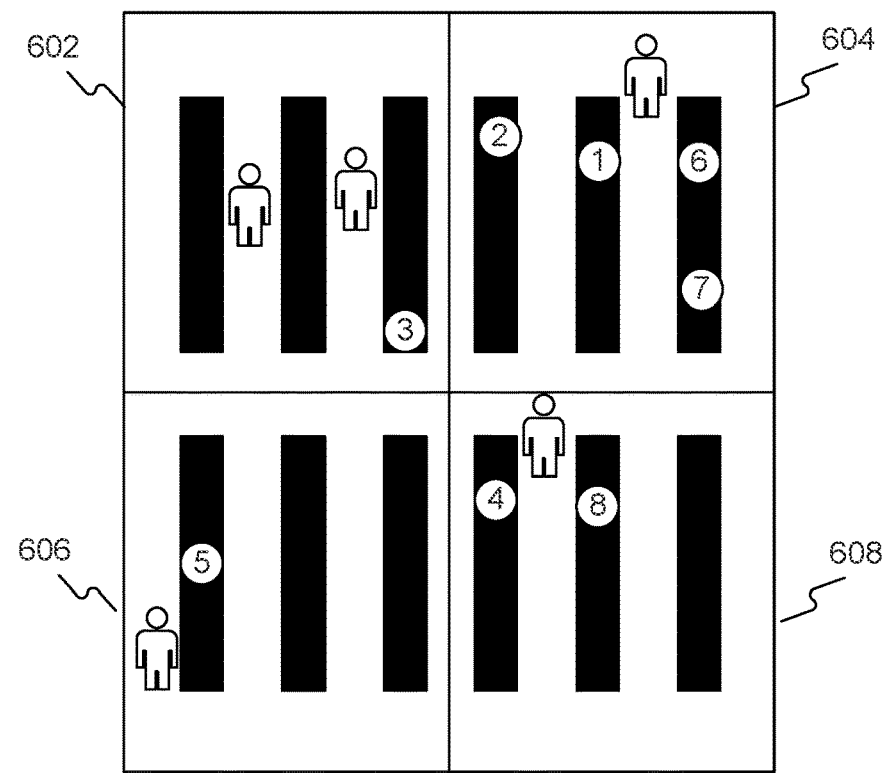
FIGS. 6B and 6C are diagrammatic illustrations of picker reassignment, consistent with the disclosed embodiments.
Figure 6C:
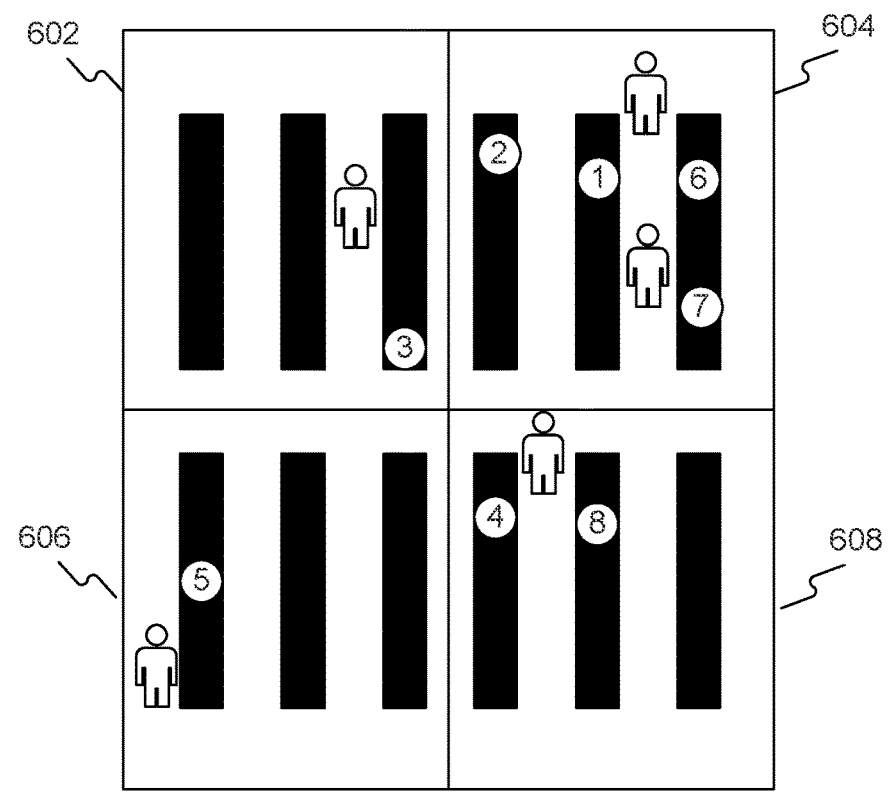

Steps 612 through 616 may be further understood by reference to FIGS. 6B and 6C showing diagrammatic illustrations of picker reassignment, consistent with the disclosed embodiments. Both FIGS. 6B and 6C show a warehouse having four zones 602 through 608. Additionally, items 1-8 are located throughout the warehouse, as well as pickers. Turning to FIG. 6B, in zone 602, there is one item (item 3) and two pickers, while zone 604 contains four items (1, 2, 6, and 7) and one picker. Thus, the item density of zone 602 is 1 (one item per the zone), while item density of zone 604 is 4 (4 items in the zone). In like manner, zone 602 has a picker density of 2, and zone 604 has a picker density of 2. Thus, zone 602 has an engagement ratio of 0.5 (one item in the zone, 2 pickers in the zone), and zone 604 has an engagement ratio of 4 (four items in the zone, 1 picker in the zone).

Returning to FIG. 6A, at step 618, FO system 113 selects a reassignment picker from a first area having the lowest engagement ratio. The selection may be random from among the pickers in the first area, or FO system 113 may identify which picker has the lowest number of item correlations. At step 620, FO system 113 re-correlates, in the data structure, initial items from the reassignment picker to a separate picker in the first area. Further, at step 622, FO system 113 re-correlates in the data structure, reassigned items from pickers in a second area having the highest engagement ratio. After FO system 113 has performed the re-correlations, FO system 113 sends, to a user device of the reassignment picker, locations and item identifiers associated with the re-correlated items. In other words, through steps 618-622, FO system 113 selects a picker to move to a busier zone (i.e., a zone with a higher engagement ratio), moves the picker's items to a different picker in the less busy zone (i.e., the zone the picker was in, which also had a lower engagement ratio), and moves items from busier pickers in the high engagement zone to the reassigned picker. For instance, after a time period, pickers may locate many items in one area, but FO system 113 may not move them to a new area because the pickers are not within a radius to be considered sufficiently close to the newer items to be assigned to the newer items. This may leave underutilized pickers in an empty area, while repeatedly tasking, and even over tasking, pickers in the busy area. Through process 600, FO system 113 may more equally distribute taskings and improve picking efficiency.

Once again, FIG. 6B helps illustrate process 600. As stated previously, zone 602 has an engagement ratio of 0.5, and zone 604 has an engagement ratio of 4. Similarly, zone 606 has an engagement ratio of 1, and zone 608 has an engagement ratio of 2. Thus, zone 602 has the lowest engagement ratio, while zone 604 has the highest engagement ratio. Accordingly, FO system 113 would select a reassignment picker from zone 602 in step 618 of process 600, transfer the picker's assignments to the remaining picker, and provide the picker with new items in zone 604. This is illustrated in FIG. 6C, wherein a picker has moved from zone 602 to zone 604. As a result, the engagement ratio of zone 602 is now 1 (rather than 0.5 as in FIG. 6B), and the engagement ratio of zone 604 is now 2 (rather than 4 as in FIG. 6B).

Figure 7A:
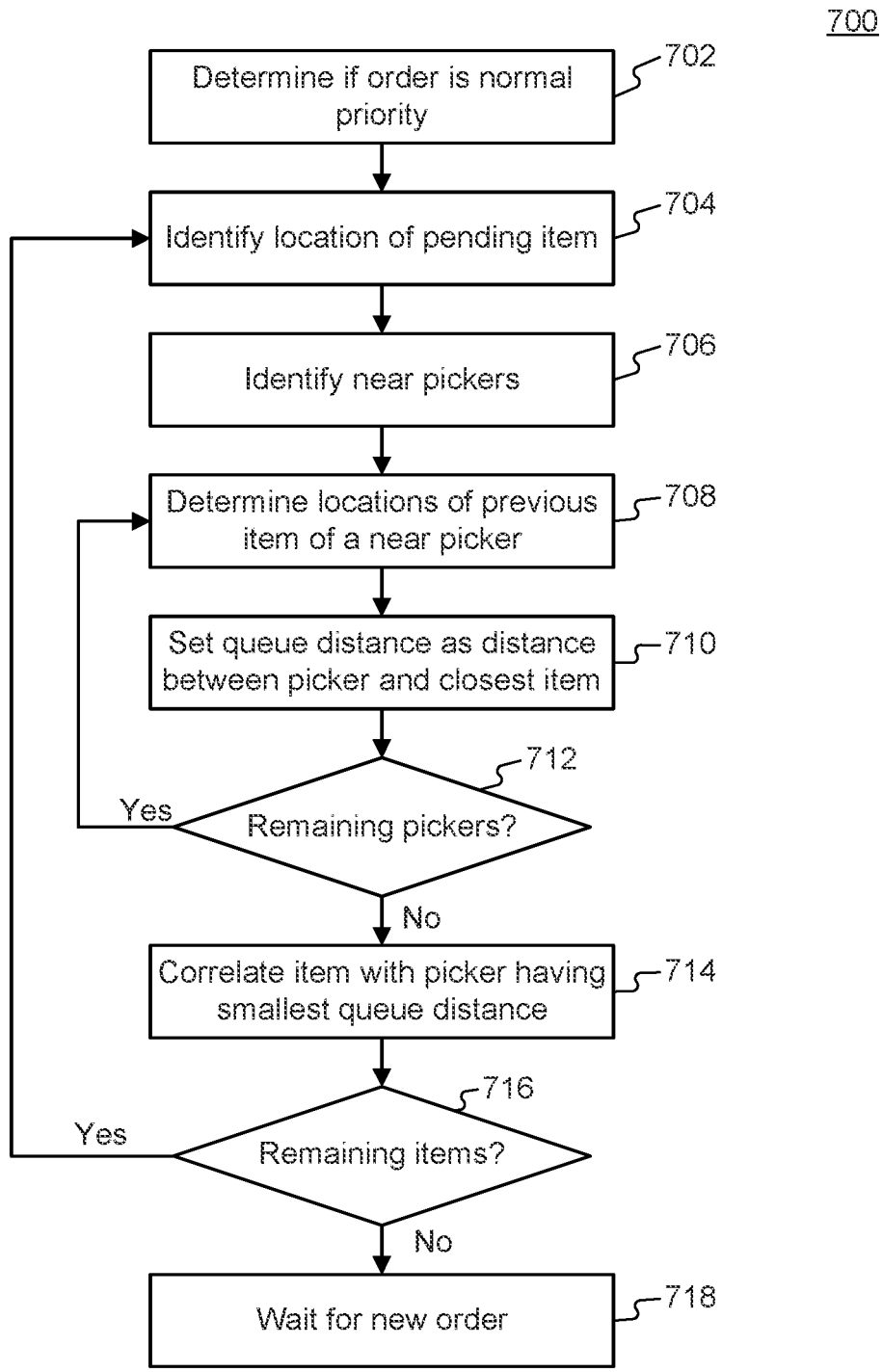
FIG. 7A is a flow chart illustrating an exemplary embodiment of a method for item correlation in a data structure, consistent with the disclosed embodiments.

FIG. 7 is a flow chart illustrating an exemplary embodiment of a method for item correlation in a data structure, consistent with the disclosed embodiments. As stated above, some orders may contain only normal priority items. Because FO system 113 may prioritize urgent prioritized items, FO system 113 may delay correlation of normal priority items, or may perform correlation in a different manner which prioritizes efficiency over speed.

At step 702 of process 700, FO system 113 determines if the order is a normal priority determining if the order is normal priority based on an amount of time remaining until the items must ship to the customer. For example, an order may have a period of days before required shipment. FO system 113 then iteratively, for pending items in the order, and in response to the order being normal priority, begins correlating items with pickers.

Figure 7B:
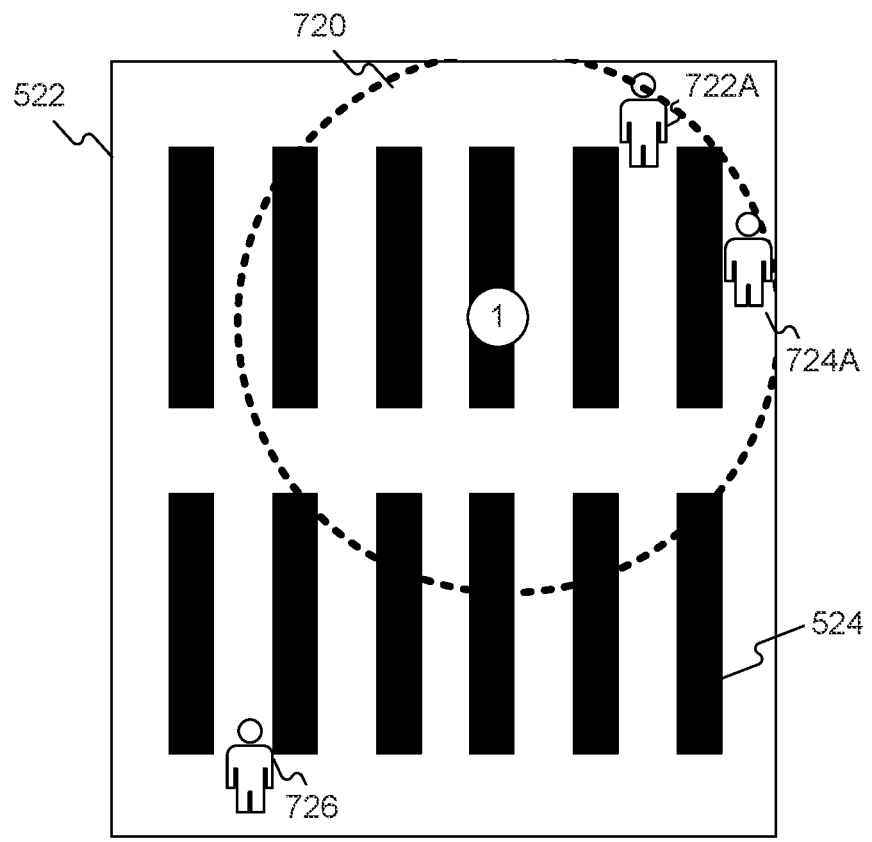
FIGS. 7B and 7C are diagrammatic illustrations of optimized picker correlation, consistent with the disclosed embodiments.
Figure 7C:
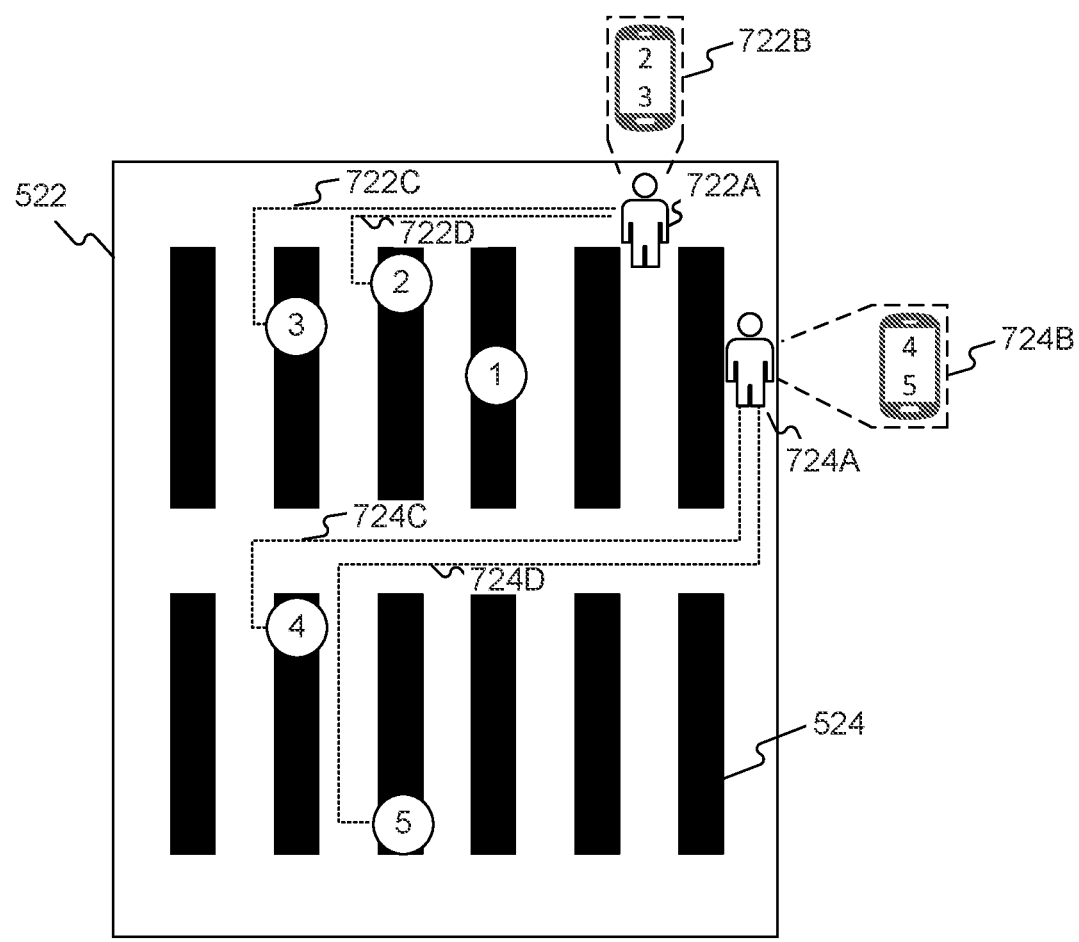

At step 704, FO system 113 identifies a location of the pending item, for instance by querying the data structure. Using the location, FO system 113 identifies a plurality of near pickers within a threshold distance to the location at step 706. This distance may be a radius, for instance. Step 706 may allow FO system 113 to pre-screen possible pickers, and avoid unnecessary analysis of far pickers. For instance, FIGS. 7B and 7C are diagrammatic illustrations of optimized picker correlation, consistent with the disclosed embodiments. Turning to FIG. 7B showing warehouse 522, three pickers 722A, 724A, and 726 are on the warehouse floor. Item 1 is located on the floor as well, and a radius 720 is drawn around item 1. Picker 726 is outside of the radius, and so picker 726 would be skipped during the remaining analysis provided by process 700 to improve processing efficiency.

Once FO system 113 has determined near pickers, FO system 113 begins iteratively, for each of the near pickers, determining the pickers' current correlations and paths. Thus, at step 708, FO system 113 determines locations of previously-correlated items of the near picker. FO system 113 then sets a queue distance of the near picker as a distance between the near picker and a closest previously-correlated item of the near picker at step 710. The queue distance therefore represents the closest of all of the items currently correlated to the picker. After FO system 113 completes steps 708 and 710 for a first picker, FO system 113 determines if there are remaining near pickers needing analysis at step 712. If there are remaining pickers, step 712 is YES, and FO system 113 returns to step 708 to analyze an additional picker. If there are no remaining pickers, step 712 is NO, and FO system 113 proceeds to step 714 to correlate the pending item to a near picker having the smallest queue distance. In some cases, there may be only a single near picker. If this occurs, then FO system 113 may omit steps 708-712. FO system 113 then proceeds to step 716, and determines if there are remaining pending items. If so, step 716 is YES, and FO system 113 returns to step 704 to identify locations of pending items. Otherwise, step 716 is NO, and FO system 113 proceeds to step 718 to wait for a new order. Alternatively, FO system 113 may use process 700 to correlate any un-correlated items in a backlog or a buffer, rather than a single order. Process 700 may also provide initial normal priority correlations for pickers who have exhausted urgent priority assignments and should thus return to current job priority of normal.

FIG. 7C illustrates steps 708 and 710. In FIG. 7C, pickers 722A and 724 have user devices 722B and 724B showing respective correlations. For example, picker 722A is correlated with items 2 and 3. FO system 113 then, at step 708, determines the locations of items 2, 3, 4, and 5 in warehouse 522, as shown. FO system 113 also determines a distance from a picker to the picker's correlated items. For example, picker 724A is correlated with items 4 and 5. FO system 113 identifies route 724C to item 4, and route 724D to item 5. In this embodiment, FO system 113 determines distances according to routes, but FO system 113 may alternatively determine distance as a direct line between two points. At step 710, FO system 113 sets the queue distance of a picker to be the shortest distance between the picker and an existing assignment. Thus, for picker 722A, FO system 113 would identify the length of route 722D as the queue distance for picker 722A, and the length of route 724C as the queue distance for picker 724A. Then, at step 714, FO system 113 would compare the distance of route 722D to the distance of route 724C, and determine that route 722D is shorter. Thus, FO system 113 would correlate new item 1 with picker 722A. Thus, process 700 may enable FO system 113 to aggregate close items and correlate them to a picker, while allowing other pickers to transit quickly to distant items without unnecessary detours, thereby improving picker efficiency.

In yet another embodiment, FO system 113 may process a set of orders having mixed priorities. FO system 113 may receive an indication of an order comprising at least one item; determine a priority of the order based on an amount of time remaining until the items must ship to a customer; and determine a location of each of a plurality of pickers. FO system 113 may then iteratively, for pending items of the order: access at least one data structure to determine a location of the pending item; determine a set of near pickers within a threshold distance to the location; access the at least one data structure to determine previous items correlated to each of the set of near pickers; and remove from the set any near picker having a number of previous items greater than a queue threshold. FO system 113 may also add to the set pickers within an expanded threshold distance in response to the set being empty after the removing of pickers. FO system 113 may continue by identifying, from the set of near pickers, a picker closest to the item in response to the priority being urgent; and identifying, from the set of near pickers, a picker having a smallest queue distance in response to the priority being normal, wherein a queue distance represents how far a picker is from a nearest correlated item of the picker. With the picker having a smallest queue distance having been identified, FO system 113 may then correlate the pending item with the identified picker in the at least one data structure; send, to a user device of the closest picker, a location and item identifier associated with the item; and store, in the data structure, a completion flag in correlation with the item upon receipt of a message from the user device that the item has been picked.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computerized system for item correlation, comprising:
    at least one processor; and
    at least one non transitory storage medium comprising instructions that, when executed by the at least one processor, cause the at least one processor to perform steps comprising:
        receiving an indication of an order comprising at least one item;
        determining if the order is urgent based on an amount of time remaining until the items must ship to a customer;
        determining a location of each of a plurality of pickers;
        iteratively, for items in the order:
            identifying a picker closest to the item, the picker having a current job priority;
            correlating the closest picker and the item in a data structure;
            re-correlating, in the data structure, at least one mutable item previously correlated with the closest picker to an alternate picker in response to the current job priority not being urgent, wherein items previously correlated with the closest picker are sequenced in the data structure according to respective correlation times, with a first N items of the sequence being fixed, a remaining M items being mutable, and a length of the sequence being limited to N+M items;
            sending, to a user device of the closest picker, a location and item identifier associated with the item; and
            storing, in the data structure, a completion flag in correlation with the item upon receipt of an item-complete message from the user device indicating that the item has been picked;
        receiving a job-complete message from a user device of a picker among the plurality of pickers;
        counting a number of items correlated to the picker that have the completion flag;
        comparing the number of items to a success threshold to determine a failure; and
        sending a signal to lock the user device of the picker when a number of failures exceeds a failure threshold.

2. The system of claim 1, wherein the success threshold is based on packaging requirements.

3. The system of claim 1, wherein identifying a picker closest to the item comprises:
    selecting a second closest picker in response to a first closest picker having a sequence length of N+M.

4. The system of claim 1, wherein the item is a first item, and the steps further comprise:
    determining a location of a second item of the order;

determining a distance between the second item and the first item; and correlating the second item to the closest picker in response to the distance being less than a threshold.

5. The system of claim 4, wherein the threshold is determined by:

calculating a first cost based on shipping the first item and second item separately;

calculating a second shipping cost based on shipping the first item and second item together;

determining a difference between the first cost and the second cost;

calculating an amount of time based on the difference; and setting the threshold to be a distance the closest picker travels during the amount of time.

6. The system of claim 1, wherein the steps further comprise:

determining a number of items that have no picker correlation in the data structure;

determining an average ratio of items per picker;

re-correlating items and pickers, in response to the number exceeding a backlog threshold and the average ratio exceeding a tasking threshold, by:

calculating an item density of a plurality of areas;

calculating a picker density of the plurality of areas;

calculating an engagement ratio of item density to picker density for each of the plurality of areas;

selecting a reassignment picker from a first area having the lowest engagement ratio;

re-correlating, in the data structure, initial items from the reassignment picker to a separate picker in the first area;

re-correlating, in the data structure, reassigned items from pickers in a second area having the highest engagement ratio; and sending, to a user device of the reassignment picker, locations and item identifiers associated with the re-correlated items.

7. The system of claim 6, wherein the re-correlating occurs on regular time intervals.

8. The system of claim 1, wherein the steps further comprise:

determining if the order is normal priority based on an amount of time remaining until the items must ship to the customer; and iteratively, for pending items in the order, and in response to the order being normal priority:

identifying a location of the pending item;

identifying a plurality of near pickers within a threshold distance to the location;

iteratively, for each of the near pickers:

determining locations of previously-correlated items of the near picker;

setting a queue distance of the near picker as a distance between the near picker and a closest previously-correlated item of the near picker;

correlating the pending item to a near picker having the smallest queue distance.

9. A computer-implemented method for item correlation, comprising:

receiving an indication of an order comprising at least one item;

determining if the order is urgent based on an amount of time remaining until the items must ship to a customer;

determining a location of each of a plurality of pickers;

iteratively, for items in the order:

identifying a picker closest to the item, the picker having a current job priority;

correlating the closest picker and the item in a data structure;

re-correlating, in the data structure, at least one mutable item previously correlated with the closest picker to an alternate picker in response to the current job priority not being urgent, wherein items previously correlated with the closest picker are sequenced in the data structure according to respective correlation times, with a first N items of the sequence being fixed, a remaining M items being mutable, and a length of the sequence being limited to N+M items;

sending, to a user device of the closest picker, a location and item identifier associated with the item; and storing, in the data structure, a completion flag in correlation with the item upon receipt of an item-complete message from the user device indicating that the item has been picked;

receiving a job-complete message from a user device of a picker among the plurality of pickers;

counting a number of items correlated to the picker that have the completion flag;

comparing the number of items to a success threshold to determine a failure; and sending a signal to lock the user device of the picker when a number of failures exceeds a failure threshold.

10. The computer-implemented method of claim 9, wherein the success threshold is based on packaging requirements.

11. The computer-implemented method of claim 9, wherein identifying a picker closest to the item comprises:

selecting a second closest picker in response to a first closest picker having a sequence length of N+M.

12. The computer-implemented method of claim 9, wherein the item is a first item, and the steps further comprise:

determining a location of a second item of the order;

determining a distance between the second item and the first item; and correlating the second item to the closest picker in response to the distance being less than a threshold.

13. The computer-implemented method of claim 12, wherein the threshold is determined by:

calculating a first cost based on shipping the first item and second item separately;

calculating a second shipping cost based on shipping the first item and second item together;

determining a difference between the first cost and the second cost;

calculating an amount of time based on the difference; and setting the threshold to be a distance the closest picker travels during the amount of time.

14. The computer-implemented method of claim 9, wherein the steps further comprise:

determining a number of items that have no picker correlation in the data structure;

determining an average ratio of items per picker;

re-correlating items and pickers, in response to the number exceeding a backlog threshold and the average ratio exceeding a tasking threshold, by:

calculating an item density of a plurality of areas;

calculating a picker density of the plurality of areas;

calculating an engagement ratio of item density to picker density for each of the plurality of areas;

selecting a reassignment picker from a first area having the lowest engagement ratio;

re-correlating, in the data structure, initial items from the reassignment picker to a separate picker in the first area;

re-correlating, in the data structure, reassigned items from pickers in a second area having the highest engagement ratio; and sending, to a user device of the reassignment picker, locations and item identifiers associated with the re-correlated items.

15. The computer-implemented method of claim 14, wherein the re-correlating occurs on regular time intervals.

* * * * *